United States Patent [19]
Furomoto

[11] Patent Number: 5,219,131
[45] Date of Patent: Jun. 15, 1993

[54] APPARATUS FOR NOTIFYING BRAKING FORCE OF A DRAG MECHANISM

[75] Inventor: Yoshiyuki Furomoto, Osaka, Japan

[73] Assignee: Shimano, Inc., Osaka, Japan

[21] Appl. No.: 723,955

[22] Filed: Jul. 1, 1991

[30] Foreign Application Priority Data

Jul. 4, 1990 [JP] Japan .................... 2-71849[U]

[51] Int. Cl.5 .................... A01K 89/015; A01K 89/01
[52] U.S. Cl. .................... 242/223; 242/245; 242/246; 242/268; 242/271
[58] Field of Search .......... 242/223, 224, 243, 244, 242/245, 246, 305, 323, 268, 271; 73/862.12, 862.32, 862.38, 862.39, 862.44; 188/1.11; 192/54, 66

[56] References Cited

U.S. PATENT DOCUMENTS

| | | | |
|---|---|---|---|
| 4,650,161 | 3/1987 | Kaneko | 242/224 |
| 4,697,758 | 10/1987 | Hirose et al. | 242/223 |
| 4,790,492 | 12/1988 | Atobe | 242/223 |
| 4,804,150 | 2/1989 | Takeuchi | 242/245 |

Primary Examiner—Stanley N. Gilreath
Attorney, Agent, or Firm—Dickstein, Shapiro & Morin

[57] ABSTRACT

A fishing reel has an apparatus for notifying a braking force of a drag mechanism. This apparatus includes a sensor for electrically measuring a pressure applied to friction surfaces of the drag mechanism, a control unit for converting a result of measurement by the sensor into a critical tension of a fishing line causing slippage of the drag mechanism, and a liquid crystal display for displaying a value of the critical tension.

18 Claims, 4 Drawing Sheets

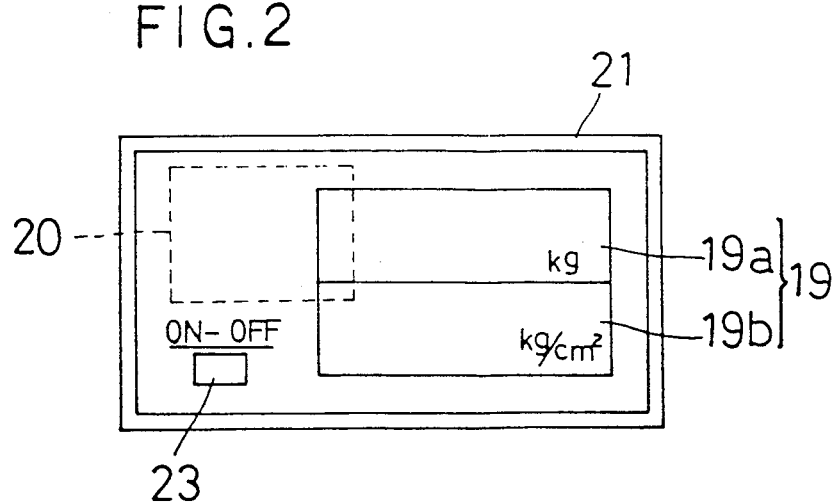
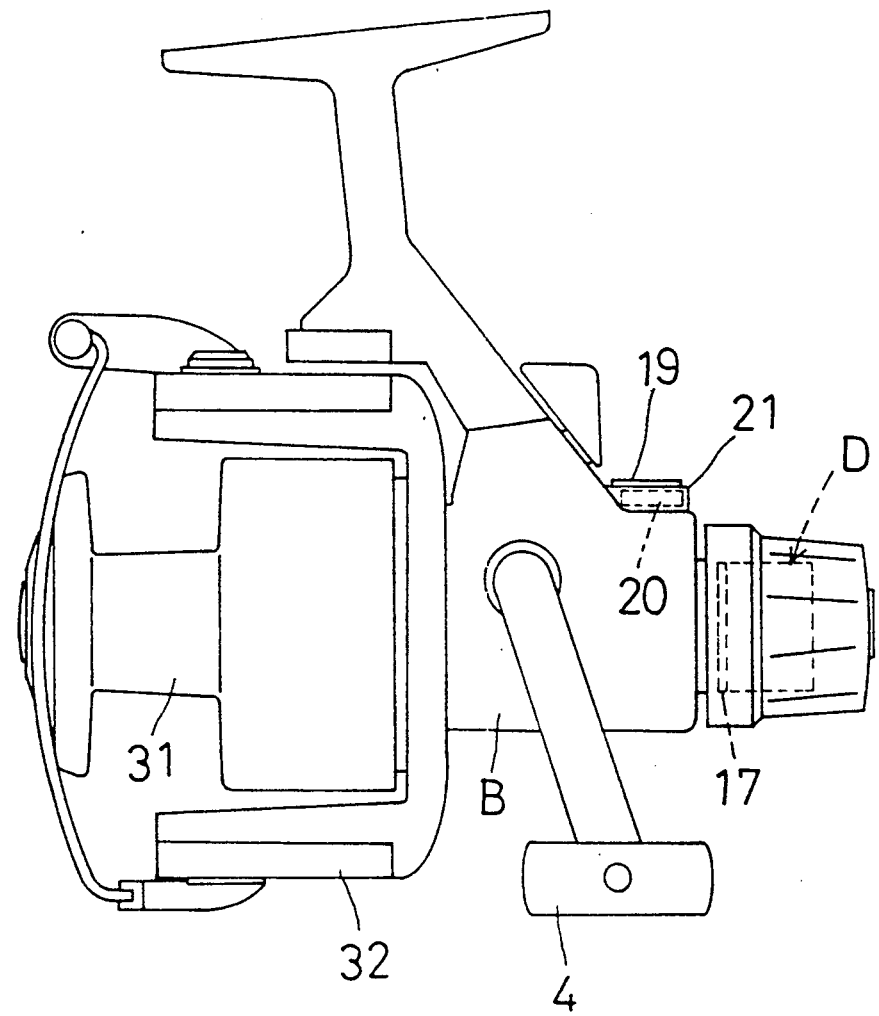

APPARATUS FOR NOTIFYING BRAKING FORCE OF A DRAG MECHANISM

BACKGROUND OF THE INVENTION

1. Field of the Invention

The present invention relates to an apparatus for notifying a braking force of a drag mechanism. More particularly, the invention relates to a technique of enabling an angler to grasp a braking force of a drag mechanism applied to rotation in a fishing line unwinding direction of a spool of a fishing reel.

2. Description of the Related Art

A conventional technique as noted above is disclosed in Japanese Patent Publication Kokai No. 1988-39530, for example. In the construction disclosed therein, a control system for setting a drag (braking force) includes a spring element that produces a torque corresponding to the drag. The torque produced by the spring element when adjusting the drag is mechanically displayed as the drag.

According to the conventional technique, however, measurement is possible only when setting is made to increase the braking force of the drag mechanism. When the angler desires to confirm the value of a braking force after its setting, he or she must look at a display and manipulate a control knob. For decreasing the braking force of the drag mechanism, the angler must take the trouble of turning the control knob to a low value and then to a desired higher value. Furthermore, a correct measurement is not possible with the conventional technique since the resistance to turning of the control knob is included in the value of load. Thus, there is room for improvement in terms of precision also.

SUMMARY OF THE INVENTION

An object of the present invention is to provide an improved apparatus enabling the angler to grasp the braking force of the drag mechanism with high precision whenever desired.

The above object is fulfilled, according to the present invention, by an apparatus for notifying a braking force of a drag mechanism, comprising a sensor for electrically measuring a pressure applied to friction surfaces of the drag mechanism, a display device for displaying a result of measurement by the sensor, and a control unit for converting the result of measurement by the sensor into a critical tension of a fishing line causing slippage of the drag mechanism, and outputting the critical tension to the display device.

With the above construction, as shown in FIG. 1, for example, the pressure applied to the friction surfaces of the drag mechanism is electrically, though indirectly, measured at all times. In addition, purely the pressure of the drag mechanism D is measured without a resistance or the like of a drag setting system being included in the measured pressure. This allows the angler to grasp the braking force based on the result of measurement at any time through the display device.

Thus, the present invention provides an improved apparatus enabling the angler to grasp the braking force of the drag mechanism with high precision whenever desired.

Other features and advantages of the invention will be apparent from the following description.

BRIEF DESCRIPTION OF THE DRAWINGS

The drawings show apparatus for notifying a braking force of a drag mechanism according to the present invention, in which:

FIG. 2 is a plan view of a control case, FIG. 3 is a side view of a different embodiment in which a drag mechanism is mounted to a spinning reel.

DETAILED DESCRIPTION OF THE PREFERRED EMBODIMENTS

An apparatus for notifying a braking force of a drag mechanism according to the present invention will be described in detail with reference to the drawings.

Figure 1:
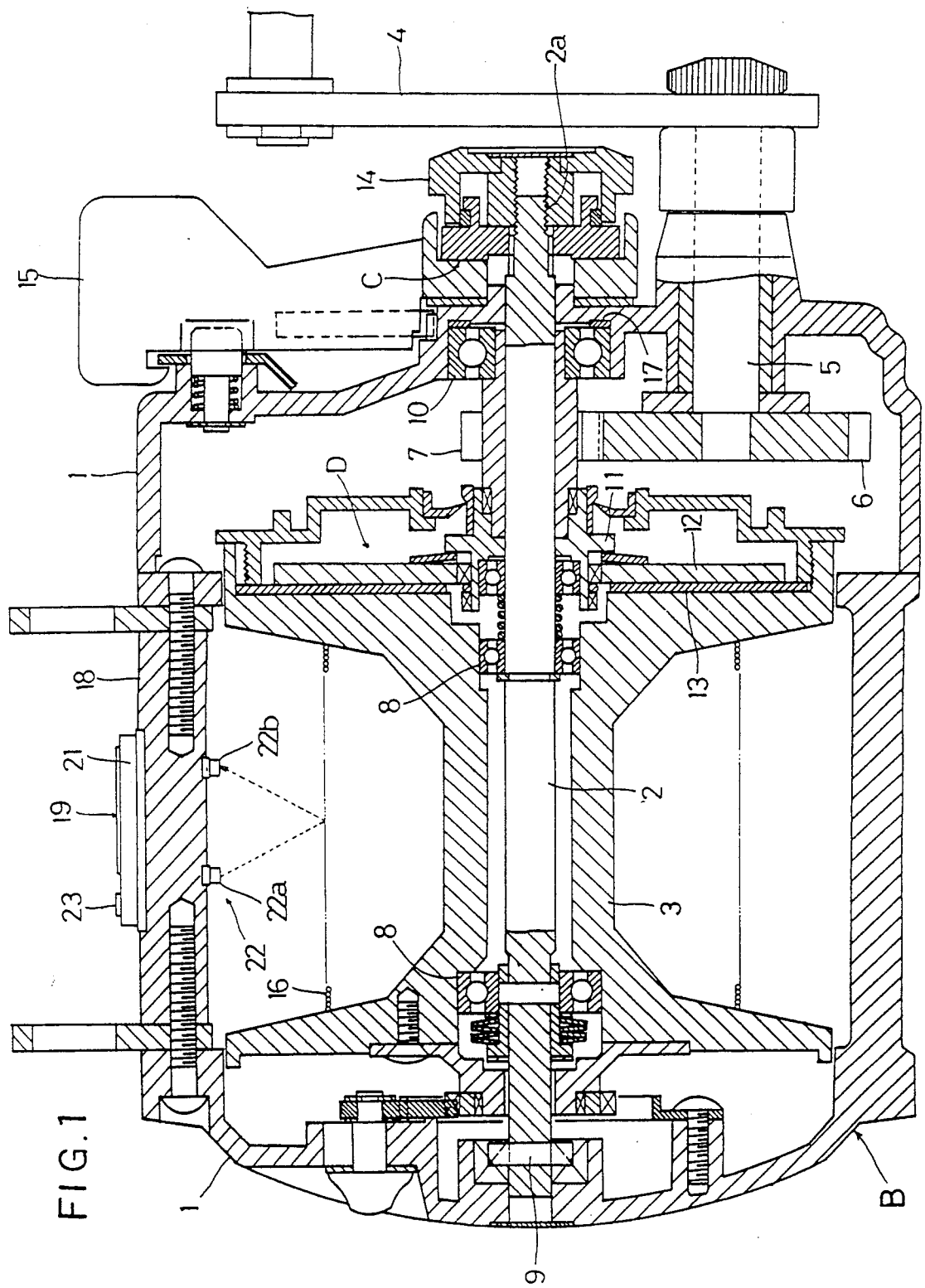
FIG. 1 is a sectional view of a two-bearing reel having an apparatus according to the present invention.

FIG. 1 shows a two-bearing reel embodying the present invention. This reel includes a reel body B having left and right side cases 1 and a spool shaft 2 freely rotatably carrying a spool 3. The reel has a transmission system for transmitting drive from a fishing line takeup handle 4 to the spool 3 through a handle shaft 5, a drive gear 6, a pinion gear 7 and a drag mechanism D.

The spool 3 is supported on the spool shaft 2 through a pair of bearings 8. A pin 9 is provided at a lefthand end of the spool shaft 2 for stopping rotation thereof. The spool shaft 2 is supported at a righthand end portion thereof in the right side case 1 through a bearing 10.

The drag mechanism D includes a disk 12 engaged with and supported by a sleeve 11 connected to the pinion gear 7, and a plate 13 provided on a lateral face of the spool 3. The load of the drag mechanism D is adjustable by a fine-adjusting knob 14 meshed with a threaded portion 2a defined at the righthand end of the spool shaft 2, a control lever 15 pivotable on the spool shaft 2, and a cam surface C formed on a proximal end of the control lever 15. For increasing the load of the drag mechanism D, the control lever 15 is turned to apply a pressure from the cam surface C to the fine-adjusting knob 14, thereby to draw the spool shaft 2 and spool 3 toward the drag mechanism D. For decreasing the load of the drag mechanism D, the control lever 15 is turned in the opposite direction.

The drag mechanism D has friction surfaces provided by opposed surfaces of the disk 12 and plate 13.

This reel has an apparatus for notifying the angler of the braking force of the drag mechanism D as converted into a critical tension of a fishing line 16 that causes slippage of the drag mechanism D.

This apparatus includes a pressure sensor 17 sandwiched between a thrust face of the bearing 10 supporting the spool shaft 2 and the right side case 1. A case 21 is mounted on a top surface of an upper frame 18 of the reel body 1. As shown in FIG. 2, this case 21 includes a liquid crystal display 19 and a control unit 20. Further, an ultrasonic sensor 22 including a transmitter 22a and a receiver 22b is attached to an undersurface of the upper frame 18 for measuring a winding diameter of the fishing line 16. With this apparatus, results of measurement by the pressure sensor 17 are used as a reference, and correction data based on results of measurement by the ultrasonic sensor 22 are transmitted to the control unit 20. The liquid crystal display 19 includes a first display unit 19a for displaying a value of the critical tension of the fishing line 16 causing slippage of the drag mechanism D.

The display 19 includes a second display unit 19b for displaying a value of pressure applied to the friction surfaces. With this apparatus, when the diameter of the fishing line 16 wound on the spool 3 is increased, the first display unit 19a displays a decreased value with the value on the second display unit 19b remaining unchanged.

Numeral 23 in FIG. 2 denotes a main switch for starting and stopping this apparatus.

With the apparatus constructed as above, the angler refers to the values shown on the liquid crystal display 19 and sets the drag mechanism D to a braking force appropriate to the strength of the fishing line used. This allows the angler to engage in fishing without breaking the fishing line 16.

Other embodiments of the present invention will be described next.

The notifying apparatus may dispense with the sensor for correction purposes by predetermining a mean value of fishing line winding diameter or a fixed fishing line winding diameter. The information as to the braking force may be given in the form of speech using a PCM sound source.

The present invention is applicable also to a spinning reel as shown in FIG. 3. In this reel, a reel body B includes a spool 31 and a rotor 32 in a forward portion, and a drag mechanism D mounted to a rear end thereof. A pressure sensor 17 is provided to measure a braking force of the drag mechanism D. A case 21 is mounted on an upper surface of the reel body B, which includes a control unit 20 and a liquid crystal display 19 for receiving results of measurement by the pressure sensor 17.

Figure 4:
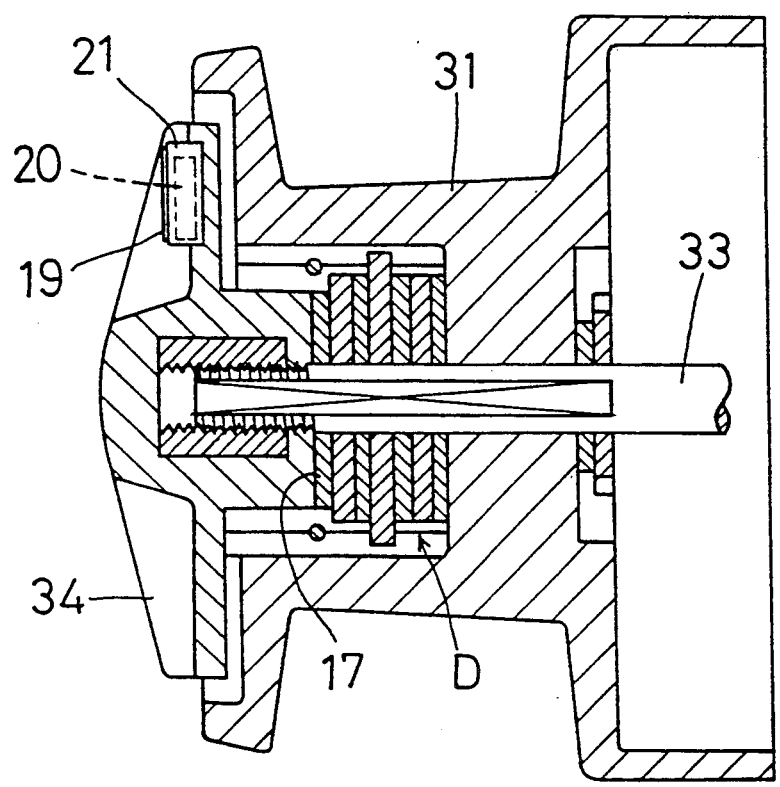
FIG. 4 is a sectional view of a further embodiment in which a drag mechanism is mounted to a spinning reel.

As shown in FIG. 4, a spinning reel having a drag mechanism D mounted in a spool 31 may include a pressure sensor 17 provided on a pressure contact portion of a turn knob 34 meshed with a spool shaft 33. The knob 34 includes a control unit 20 and a liquid crystal display 19 for receiving results of measurement by the pressure sensor 17.

Figure 5:
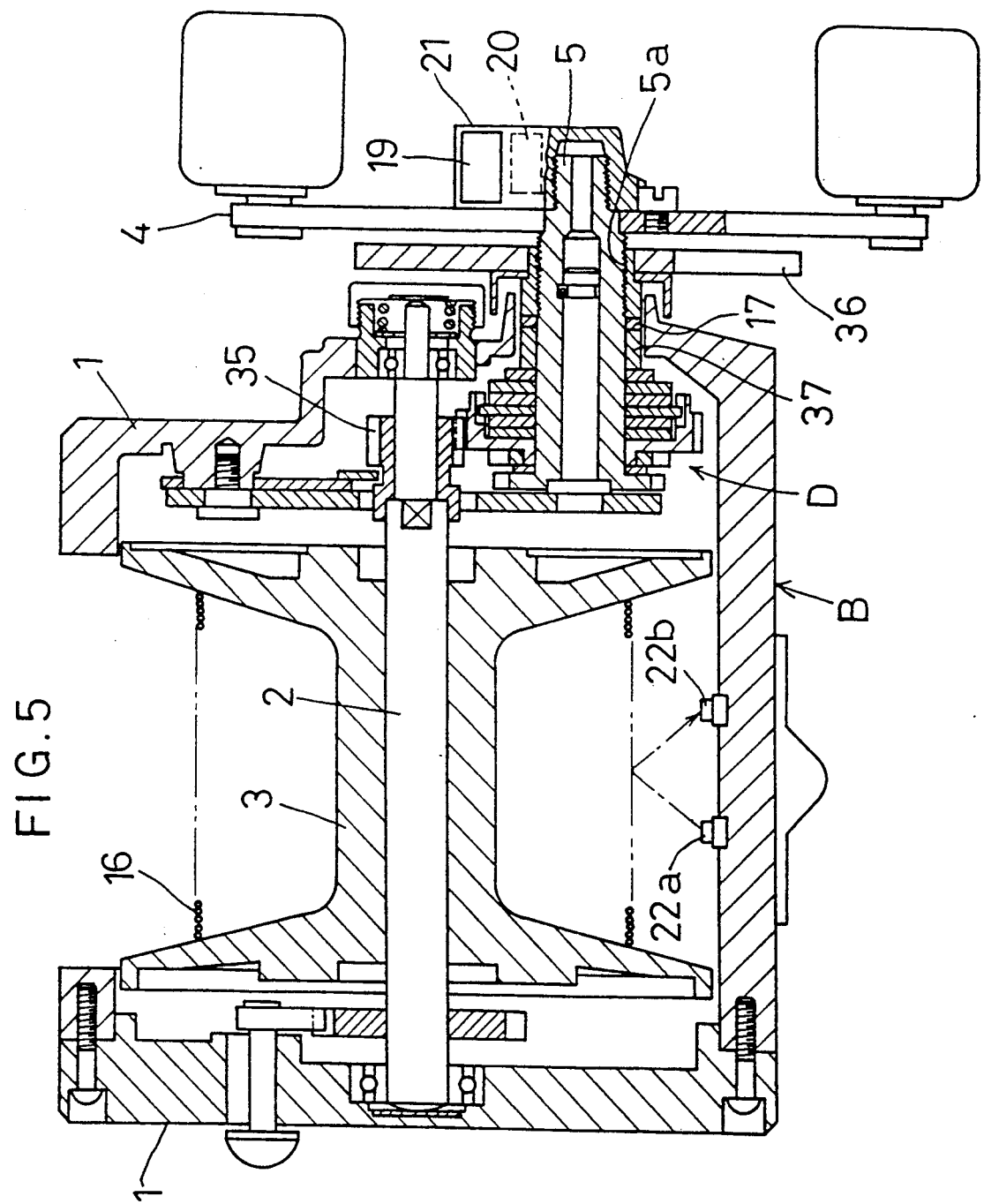
FIG. 5 is a sectional view of a still further embodiment in which a drag mechanism is mounted to a handle shaft of a two-bearing reel.

FIG. 5 shows a further embodiment which is a two-bearing reel. This reel has an integrally formed reel body B including a spool rotatable with a spool shaft 2. A handle 4 is connected to a handle shaft 5 including a drag mechanism D for transmitting drive to a pinion gear 35 mounted on the spool shaft 2. A pressure sensor 17 is mounted between a drag adjuster 36 meshed with a threaded portion 5a of the handle shaft 5 and a sleeve 37 for transmitting pressure from the adjuster 36 to the drag mechanism D.

Further, a sensor 22 identical to the sensor shown in FIG. 1 may be provided in the reel body B so as to measure a winding diameter of the fishing line wound about the spool. Then, the handle 4 may be provided with the control device 20 for receiving measurement results from the two sensors 17, 22 and for outputting a calculated result to the liquid crystal display 19.

What is claimed is:

1. A two-bearing reel comprising:
   a reel body including a pair of right and left side cases;
   a spool shaft;
   a spool for winding a fishing line;
   a transmission system including a handle, a handle shaft, a drive gear mounted on said handle shaft, a pinion gear, and a drag mechanism, said drag mechanism having friction surfaces;
   a first sensor for electrically measuring a pressure applied to said friction surfaces of said drag mechanism, and for thereby obtaining a first measurement result;
   a second sensor for measuring a diameter of the fishing line wound about said spool, and for thereby obtaining a second measurement result;
   a control means for calculating, based on the measurement results obtained by said first and second sensors, a critical tension of the fishing line causing slippage of said drag mechanism; and
   notifying means for displaying the measurement result obtained by said first sensor and also the critical tension calculated by said control means.

2. A two-bearing reel according to claim 1, wherein said drag mechanism includes said pinion gear and a sleeve associated with said pinion gear, said pinion gear being rotatably mounted on said spool shaft, and wherein said friction surfaces of said drag mechanism include a disc and a plate, said disc being engaged with and supported on said sleeve, said plate being attached to a lateral face of said spool, and wherein said two-bearing reel includes means for adjusting said drag mechanism, said drag mechanism being arranged to transmit force from said handle to said spool.

3. A two-bearing reel according to claim 2, wherein said means for adjusting said drag mechanism includes a fine-adjusting knob disposed at an end of said spool shaft, a control lever pivotable on said spool shaft, and a cam surface formed on a proximal end of said control lever.

4. A two-bearing reel according to claim 2, wherein said control means and said notifying means are attached to said reel body.

5. A two-bearing reel according to claim 1, wherein said drag mechanism includes a plurality of discs mounted on said handle shaft, said drive gear being rotatably mounted on said handle shaft, said pinion gear being rotatably mounted on said spool shaft, and wherein said reel further includes means for adjusting said drag mechanism, said drag mechanism being arranged to transmit force from said handle to said spool.

6. A two-bearing reel according to claim 5, wherein said means for adjusting said drag mechanism is a drag adjuster attached to said handle shaft.

7. A two-bearing reel according to claim 5, wherein said control means and said notifying means are attached to said handle.

8. A two-bearing reel according to claim 1, further comprising a drag adjuster mounted on said handle shaft, and a sleeve for transmitting pressure from said drag adjuster to said drag mechanism, and wherein said first sensor is mounted between said drag adjuster and said sleeve, and wherein said second sensor is attached to said reel body.

9. A two-bearing reel according to claim 1, wherein said second sensor includes a transmitter and a receiver.

10. A two-bearing reel according to claim 9, wherein said sensor is an ultrasonic sensor.

11. A two-bearing reel according to claim 1, wherein said notifying means is a liquid crystal display.

12. A two-bearing reel according to claim 11, wherein said liquid crystal display has two display units.

13. A spinning reel comprising:

a reel body;
a spool shaft;
a spool for winding a fishing line;
a handle, and a transmission system for transmitting a force from said handle to said spool;
a drag mechanism having friction surfaces;
a sensor for electrically measuring a pressure applied to said friction surfaces of said drag mechanism;
control means for calculating, based on a set fishing line winding diameter and on a measured result from said sensor, a critical tension of the fishing line causing slippage of said drag mechanism; and
notifying means for displaying the critical tension calculated by said control means.

14. A spinning reel according to claim 13, wherein said drag mechanism is attached to a rear portion of said reel body, and wherein said sensor is disposed in said drag mechanism.

15. A spinning reel according to claim 13, wherein said drag mechanism is mounted on said spool shaft inside said spool, and wherein a turn knob is meshed on said spool shaft in opposition to said drag mechanism, said sensor being disposed at a pressure contact portion between said drag mechanism and said turn knob.

16. A spinning reel according to claim 13, wherein said notifying means is a liquid crystal display.

17. A spinning reel according to claim 16, wherein said liquid crystal has two display units.

18. A two-bearing reel according to claim 1, further comprising a bearing for supporting said pinion gear, said bearing having an outer race, and wherein said first sensor is disposed between said outer race of said bearing and one of said side cases, and wherein said second sensor is attached to said reel body.

* * * * *